ELECTRICAL TRANSDUCING

Filed Oct. 20, 1965

INVENTOR.
FRANK B. FLINT
BY
Wolf, Greenfield & Hieken
ATTORNEYS 3,372,937
ELECTRICAL TRANSDUCING Frank B. Flint, Weymouth, Mass., assignor to Automatic Radio Manufacturing Co., Inc., Melrose, Mass., a corporation of Massachusetts Filed Oct. 20, 1965, Ser. No. 498,289
4 Claims. (Cl. 274—11)

ABSTRACT OF THE DISCLOSURE

In a tape player a tape transducing head is secured to a vertical slide that terminates at its lower end in a cam lever riding upon a cam as the horizontal flange of the vertical slide is urged downward by a leaf spring attached to the upper flange of a head support subchassis. A rubber follower urges the tape against the drive spindle. The rubber follower may be selectively positioned from a withdrawn position below the tape player chassis to an extended position urging the tape against the drive spindle. In the extended position a pair of springs are so arranged that they exert a moment about the horizontal pivotal axis of the rubber follower to keep it urged against the drive spindle. With one of the springs very close to this pivotal axis, only a slight angular displacement of the rubber follower about that axis toward the retracted position causes this spring to move to the other side of this pivotal axis and help angular movement in this direction toward the retracted position.

The present invention relates in general to electrical transducing and more particularly concerns novel tape recording apparatus especially suitable for use in magnetic tape reproducing and/or recording apparatus for use in vehicles where the especially reliable, rugged and easy-to-operate structure according to the invention is especially advantageous.

Automobile magnetic tape reproducers are meeting with increasing popularity because they provide a means for continuously providing quality stereophonic sound reproduction with relatively slight attention from the driver. The present commercially available units have a number of disadvantages. Mechanical means for positioning the transducing head to scan a selected one of a plurality of recording tracks on the tape is relatively complex and not easily accessible. Electromechanical techniques for positioning the head for track selection is relatively costly. And the capstan for urging the magnetic tape against the driving spindle which pulls the tape across the scanning head is subject to wear with the eventual result that an even pull may not be exerted on the tape, resulting in undesired wow and/or flutter.

Accordingly, it is an important object of this invention to overcome one or more of the preceding disadvantages.

It is another object of the invention to provide an improved mechanism for positioning a tape transducing means to select any of a plurality of recording tracks.

It is another object of the invention to achieve the preceding objects with relatively simple, reliable mechanical means that is convenient to operate and relatively low in cost to produce.

It is a further object of the invention to provide improved means for orienting a capstan relative to a tape driving spindle.

It is a further object of the invention to achieve the preceding object with a means that minimizes capstan wear.

It is a further object of the invention to achieve the preceding object with a pivotable capstan that may be retracted to allow insertion of a tape cartridge and extended into position positively urging the tape against the driving spindle. When a cartridge is inserted into position, this is accomplished automatically, and the driver need not take his eyes off the road.

According to the invention, camming means mechanically coupled to an accessible control precisely and selectively position a tape transducing head in any of a plurality of positions along a direction, usually vertical, perpendicular to the direction of scanning.

According to another aspect of the invention, a follower means is arranged to rotate about a second axis parallel to a first axis about which a cooperating tape drive spindle rotates. The follower means is mounted so that its axis of rotataion is pivotable about a third axis perpendicular to the first and second axes. Spring means urge the follower means against the driving spindle means.

Still another feature resides in the spring means comprising first and second generally parallel springs pivotable about first and second fixed pivot points at one end and first and second movable pivot points at the other end which movable pivot points are arranged to rotate about said third axis as said spindle means moves from a fully retracted position to a fully extended position with said springs crossing said third axis during such movement.

Numerous other features, objects and advantages of the invention will become apparent from the following specification when read in connection with the accompanying drawing in which.

Figure 1:
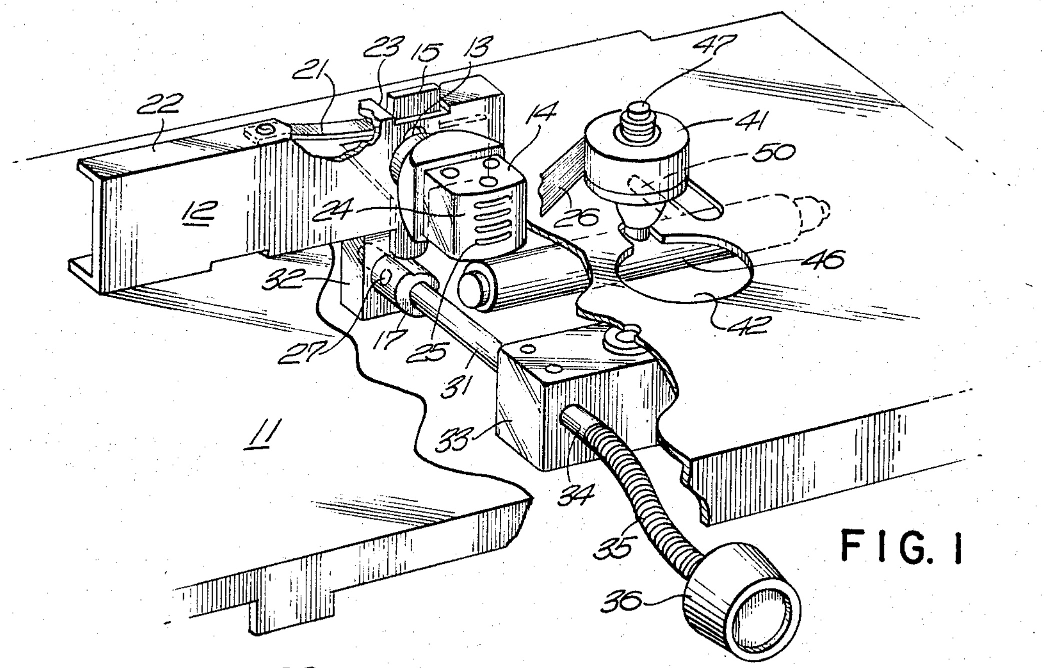
FIG. 1 is a perspective view illustrating the details of a novel transducing head positioning mechanism according to the invention.

With reference now to the drawing and more particularly FIG. 1 thereof, there is shown a perspective view of a preferred embodiment of the invention permitting reliable mechanical selection of any four pairs of tracks recorded on a magnetic tape for stereo reproduction. Since standard tape cartridges are employed in the invention, the cartridge itself and other details of a complete tape reproducer are not shown in the drawings so as not to obscure the features of the invention. The invention is embodied in the commercially available Automatic Radio type ESP–5457 "TAPE–DEK" recorder unit, and variations now being designed.

A main normally horizontal chassis 11 supports a head support subchassis 12 formed with a generally oval vertical slot 13 through which tape transducing head 14 is secured to the vertical slide 15 terminating at its lower end in cam lever 16 which rides on cam 17 as the horizontal flange of vertical slide 15 is urged downward by leaf spring 21 attached to the upper flange 22 of subchassis 12. Upper flange 22 is formed with a horizontal rectangular opening 23 that allows vertical slide 15 to move vertically but restricts its lateral movement in the horizontal plane. Thus, once transducing head 14 is securely mounted to vertical slide 15 and properly aligned so that the gaps 24 and 25 scan a related pair of tracks on the magnetic tape 26 bearing left and right stereo channel signals, the head 14 may be selectively translated vertically but is restricted from horizontal translation or angular movement about a horizontal axis.

Figure 3:
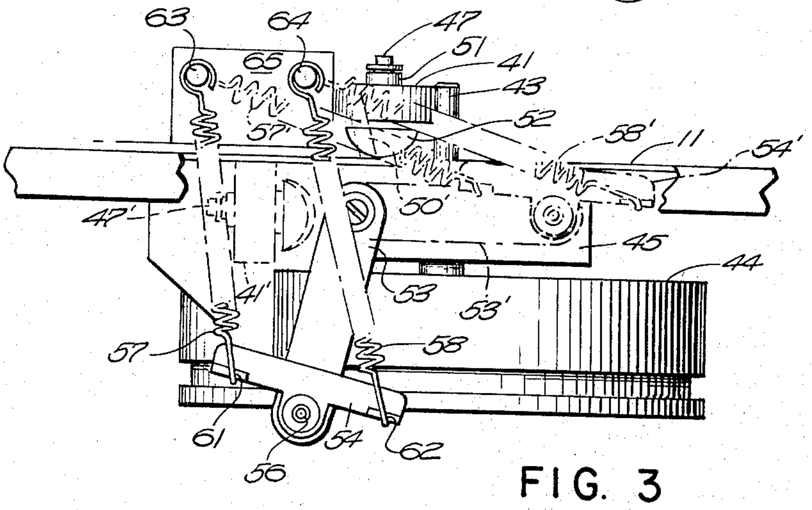
FIG. 3 is a side view illustrating the novel capstan arangement according to the invention and how various movable elements change when the capstan moves from the fully extended to the fully retracted position.
Figure 2:
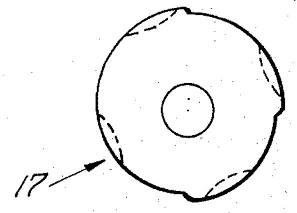
FIG. 2 is an enlarged end view of the four position cam shown in FIG. 1.

Cam 17 is secured by means including a set screw 27 to rotatable shaft 31 mounted in shaft supports 32 and 33. The panel end 34 of shaft 31 is coupled by a flexible coupling 35 to a knob 36 outside the front panel (not shown). The listener may rotate knob 36 to rotate cam 17 and thereby position head 14 to any of four positions to select any of four pairs of tracks recorded on magnetic tape 26. FIG. 3 is an end view of cam 17. Although the vertical head position must be maintained within a tolerance of .005 inch, the selection of the desired pair of tracks is accurately maintained in a moving vehicle subject to considerable vibration.

In a preferred embodiment of the invention for use in an automobile and installation beneath the dashboard, the tape 26 is preferably an endless tape in a cartridge of the type commercially available in which the rubber follower 41 is in a retracted postion below opening 42 in the chassis until the tape reel is inserted at which time rubber follower 41 urges tape 26 against drive spindle 43.

Referring to FIG. 3 there is shown a side view of structure according to the invention helpful in understanding how the tape drive means according to the invention functions. The elements represented in broken line indicate element positions when rubber follower 41 is in the retracted position, FIG. 3 showing the position of the elements in solid outline when rubber follower 41 is in its extended position against drive spindle 43.

A subchassis 44 is shown suspended from the top chassis plate 11 and may accommodate the drive motor and suitable related elements. Another subchassis 45 is also suspended from top chassis plate 11 and may accommodate a horizontal shaft 46 (best seen in FIG. 1) which rotates as rubber follower 41 moves between retracted and extended positions.

In the extended position shown in FIG. 3 rubber follower 41 rotates about the vertical axis of its shaft 47. Shaft 47 is formed with a hub 51 whose lower edge is urged upward by a V-diaphragm spring 52 whose lower edges rest on top chassis plate 11 to keep rubber follower 41 in an essentially stationary position vertically and functioning as a means for absorbing shocks occurring in a moving vehicle.

A follower positioning mechanism facilitates easily and properly positioning follower 41. Horizontal shaft 46 supports attached shaft 47 and stem lever arm 53. Cap lever arm 54 is pivotable about the end 56 of stem arm 53. Springs 57 and 58 are attached to respective opposite ends 61 and 62 of cap lever arm 54 and to fixed points 63 and 64, respectively, of side plate 65 supported on top chassis plate 11.

In the position shown with rubber follower 41 extended springs 57 and 58 are on the same side of the axis about which stem lever arm 53 pivots to exert a moment about the horizontal axis of shaft 46 that keeps rubber follower 41 urged against drive sprindle 43. At the same time cap lever arm 54 is essentially perpendicular to stem lever arm 53 so that the moment exerted by spring 58 about pivot point 56 is substantially equal and opposite to the moment exerted by spring 57 about pivot point 56. Since spring 58 is very close to the axis of rotation of horizontal shaft 46, only a slight counterclockwise angular displacement of that shaft (and corresponding angular movement of stem lever arm 53) will result in spring 58 moving to the right of the axis of rotation of horizontal shaft 46 to aid this angular movement until both springs 57 and 58 are in positions 57′ and 58′, respectively, indicated in broken lines. Then cap arm 54 and stem arm 53 are in positions 54′ and 53′ shown essentially horizontal and parallel to the then horizontal axis of follower shaft 47 in position 47′ with follower 41 in the fully retracted position 41′. Actuating stem 50′ is then in the upright position shown ready to be actuated by insertion of a tape cartridge to rotate horizontal shaft 46 clockwise and initiate movement of rubber follower 41 into the extended position. When spring 57 moving clockwise about pivot point 63 crosses the horizontal axis of horizontal shaft 46, spring 57 helps continue the clockwise rotation of the assembly until rubber follower 41 again assumes the extended position with actuating stem 50 then in the retracted position as best seen in FIG. 1.

This mechanical arrangement has a number of advantages. The springs not only help to keep rubber follower 41 in the selected extended or retracted position, but also help to move rubber follower 41 to the newly selected positon once selection has been initiated. In addition, the spring means for maintaining rubber follower 41 in the desired position helps minimize wear on the tape drive arrangement by absorbing shocks that would otherwise be absorbed by one or both of the follower 41 and drive spindle 43.

There has been described a novel mechanism for a vehicular tape recorder unit capable of providing simple and positive means for safely selecting tape transducing head position and tape drive means by a driver who need not take his eyes off the road while helping to insure long life of the movable elements with a structure that is relatively inexpensive to manufacture on a production basis. It is evident that those skilled in the art may now make numerous uses and modifications of and departures from the specific embodiment described herein without departing from the inventive concepts. Consequently, the invention is to be construed as limited solely by the spirit and scope of the appended claims.

The embodiments of the invention in which an exclusive property or privilege is claimed are defined as follows:

1. In electrical tape transducing apparatus for transducing electrical signals that may be recorded on a plurality of parallel recording tracks on a tape recording medium apparatus comprising,
- means defining a main chassis,
- a transducing means subchassis,
- transducing means arranged to scan at least one track on a tape recording medium along a prescribed scanning direction,
- means for supporting said tranducing means for defining a path of relative movement of said transducing means and said transducing means subchassis in a second direction substantially at right angles to said prescribed direction of scanning,
- means including cam means for selectively positioning said means for supporting along said second direction to select prescribed track on said tape recording medium scanning by said transducing means,
- said cam means being movable to a plurality of discrete positions to select a plurality of discrete tracks for scanning by said transducing means,
- said means for supporting including slide means carrying said transducing means,
- means for restricting movement of said slide means to translation along a direction at right angles to said direction of scanning and parallel to the normal plane of said tape recording medium when being scanned by said transducing means,
- said cam means including a rotatable cam and a cam lever,
- means for maintaining said cam lever in fixed relationship with respect to said slide means and resting upon said cam,
- means for selectively rotating said cam to any one of a plurality of stable positions to position said slide means so that said transducing means is then in a position to scan a corresponding recording track,
- said cam being formed with a plurality of adjacent curved surfaces together surrounding the axis of rotation of said cam with each of said curved surfaces being spaced from the latter axis of rotation by a respective different radial distance so that each of said curved surfaces establishes a respective one of said stable positions,
- spring means for urging said slide means toward said can means,
- drive spindle means rotatable about a first axis generally perpendicular to said main chassis,
- follower means rotatable about a second axis parallel to said first axis when said follower means is in an extended position arranged to coact with said drive spindle means to sandwich tape recording medium therebetween and translate said tape recording medium along said prescribed scanning direction.

spring means for urging said follower means toward said drive spindle means when said follower means is in said extended position, follower shaft means comprising said follower means, actuation pin means, follower axle support means having its axle axis generally parallel to said main chassis and substantially perpendicular to said follower shaft means and substantially perpendicular to said actuating pin means and supporting said follower shaft means and said actuating pin means in fixed relative relationship, means for supporting said follower axle support means for rotation about said axle axis, first lever arm means secured to said follower axle support means in fixed relative relationship and having a first pivot point radially displaced from said axle axis, second lever arm means pivotally attached to said first lever arm means at said first pivot point at the point of said second lever arm means intermediate second and third pivot points thereon, spring support means defining first and second spaced spring element support points maintained in fixed relationship with respect to said main chassis, a first spring element means connected between said first spring element support point and said second pivot point, and a second spring element connected between said second spring element support point and said third pivot point, whereby said follower axle support means is rotatable between a first stable position with both said spring element means on one side of said axle axis and with said first and second lever arms essentially in line and a second stable position with both said spring element means on the other side of said axle axis and with said first and second lever arms in essentially orthogonal relationship.

2. Apparatus in accordance with claim 1 and further comprising, knob means rotatably supported in said main chassis conveniently accessible to an operator, and mechanical means for coupling rotary motion of said knob means to rotary motion of said cam to permit selectively positioning said transducing means by rotating said knob means.

3. In electrical tape transducing apparatus, apparatus comprising, means defining a main chassis, a rotatable stationary spindle means, means for supporting said stationary spindle means for rotation about a first axis generally perpendicular to said main chassis, a rotatable follower means positionable for rotation about a second axis parallel to said first axis and having a diameter larger than that of said spindle means, means for establishing the axis of rotation of said follower means pivotable about an axle axis perpendicular to both said first and second axes, spring means for applying a moment upon said follower means about said axle axis to urge said follower means against said spindle means with said first and second axis substantially parallel.

follower shaft means comprising said follower means, actuating pin means, follower axle support means having its axle axis generally parallel to said main chassis and substantially perpendicular to said follower shaft means and substantially perpendicular to said actuating pin means and supporting said follower shaft means and said actuating pin means in fixed relative relationship, means for supporting said follower axle support means for rotation about said axle axis, first lever arm means secured to said follower axle support means in fixed relative relationship and having a first pivot point radially displaced from said axle axis, second lever arm means pivotally attached to said first lever arm means at said first pivot point at a point of said second lever arm means intermediate second and third pivot points thereon, spring support means defining first and second spaced spring element support points maintained in fixed relationship with respect to said main chassis, a first spring element means connected between said first spring element support point and said second pivot point, and a second spring element means connected between said second spring element support point and said third pivot point, whereby said follower axle support means is rotatable between a first stable position with both said spring element means on one side of said axle axis and with said first and second lever arms essentially in line and a second stable position with both said spring element means on the other side of said axle axis and with said first and second lever arms in essentially orthogonal relationship.

4. In electrical tape transducing apparatus, apparatus comprising, means defining a main chassis, a rotatable stationary spindle means, means for supporting said stationary spindle means for rotation about a first axis generally perpendicular to said main chassis, a rotatable follower means positionable from a withdrawn position beneath said chassis to an extended position above said chassis for rotation about a second axis parallel to said first axis and having a diameter larger than that of said spindle means for urging tape against said spindle means, means for establishing the axis of rotation of said follower means pivotable about an axle axis perpendicular to both said first and second axes, fixed spring support means defining first and second spaced spring element support points maintained in fixed relationship with respect to said main chassis, movable spring support means defining third and fourth spaced spring element support points maintained in fixed relationship with respect to said follower means and rotatable about said axle axis, a first spring element means having a fixed end connected to said first spring element support point and having a movable end connected to said fourth spring element support point, and a second spring element means having a fixed end connected to said second spring element support point and having a movable end connected to said fourth spring element support point, said fixed spring support means and said movable spring support means coacting to position said spring element means so that at least one of said spring element means comprises means for urging said follower means against said spindle means when said follower means is in said extended position and at least one of said spring element means comprises means for urging said follower means toward said withdrawn position when said follower means is moving from said extended position whereby said first and second spring element means comprise means for establishing said extended and withdrawn positions as stable positions.

References Cited

UNITED STATES PATENTS

| | | | |
|---|---|---|---|
| 2,468,198 | 4/1949 | Heller | 179—100.2 |
| 2,898,113 | 8/1959 | Namenyi-Katz | 179—100.2 |
| 3,027,112 | 3/1962 | Flan | 242—55.19 X |
| 3,096,920 | 7/1963 | Schober | 242—55.19 X |
| 3,301,564 | 1/1967 | Platt | 274—11 |

WILLIAM D. MARTIN, Jr., *Primary Examiner.*